United States Patent
Huf et al.

(10) Patent No.: US 11,364,825 B2
(45) Date of Patent: Jun. 21, 2022

(54) VEHICLE SEAT ARRANGEMENT

(71) Applicant: Bayerische Motoren Werke Aktiengesellschaft, Munich (DE)

(72) Inventors: Andreas Huf, Neusaess (DE); Sylvia Kleindl, Munich (DE); Fabian Koehler, Valley (DE); Martin Unger, Berlin (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 98 days.

(21) Appl. No.: 17/040,169

(22) PCT Filed: Mar. 22, 2019

(86) PCT No.: PCT/EP2019/057260
§ 371 (c)(1),
(2) Date: Sep. 22, 2020

(87) PCT Pub. No.: WO2019/180213
PCT Pub. Date: Sep. 26, 2019

(65) Prior Publication Data
US 2021/0114493 A1    Apr. 22, 2021

(30) Foreign Application Priority Data

Mar. 23, 2018 (DE) .................... 10 2018 204 460.0

(51) Int. Cl.
*B60N 2/42*    (2006.01)
*B60N 2/20*    (2006.01)
*B60N 2/427*   (2006.01)

(52) U.S. Cl.
CPC ............... *B60N 2/43* (2013.01); *B60N 2/20* (2013.01); *B60N 2/4279* (2013.01);
(Continued)

(58) Field of Classification Search
CPC .............. B60N 2/4279; B60N 2/42709; B60N 2/42727; B60N 2/42736; B60N 2/43; B60R 2021/0213; B60R 2021/022
See application file for complete search history.

(56) References Cited

U.S. PATENT DOCUMENTS 3,992,046 A * 11/1976 Braess ................. B60N 2/4221
                                                    296/68.1
5,746,467 A *  5/1998 Jesadanont ............. B60R 22/14
                                                    296/68.1
(Continued)

FOREIGN PATENT DOCUMENTS

CN    203331879 U    12/2013
CN    203410331 U     1/2014
(Continued)

OTHER PUBLICATIONS

International Search Report (PCT/ISA/210) issued in PCT Application No. PCT/EP2019/057260 dated Jul. 12, 2019 with English translation (four (4) pages).
(Continued)

*Primary Examiner* — Syed A Islam
(74) *Attorney, Agent, or Firm* — Crowell & Moring LLP

(57) ABSTRACT

A vehicle seat arrangement has a vehicle seat for attaching to a vehicle structure of a vehicle, in particular a motor vehicle, with a lower seat part having a seat structure and with a seat back. The lower seat part is mounted or can be mounted in a longitudinally displaceable manner on the vehicle structure by a seat console, wherein at least the seat back is adjustable from a sitting position into a resting or lying position, and wherein between the lower seat part and the vehicle structure an energy absorption device is provided. In the event of a collision of the vehicle with an obstacle, the energy absorption device permits a braked relative movement along a braking path between the vehicle (Continued)

seat, which persists in a forwards movement due to inertia, and the vehicle structure, which is braked due to the collision. In the normal state, the vehicle seat is locked relative to the vehicle structure by a locking device and the locking is released in the event of a collision. The locking device is designed such that the locking is released and the longitudinal displaceability of the vehicle seat is enabled before the mass-induced forces of inertia of the body of a person lying on the vehicle seat are completely supported on the seat structure of the lower seat part, and therefore the body only enters into force-transmitting contact with the seat structure when the vehicle seat is already moving forwards relative to the vehicle structure.

15 Claims, 2 Drawing Sheets

(52) U.S. Cl.
CPC ...... *B60N 2/42709* (2013.01); *B60N 2/42727* (2013.01); *B60N 2/42736* (2013.01)

(56) References Cited

U.S. PATENT DOCUMENTS

| | | | | |
|---|---|---|---|---|
| 6,092,853 | A * | 7/2000 | Hubbard | B60N 2/4221 296/68.1 |
| 6,142,564 | A * | 11/2000 | Pajela | B60N 2/4279 297/216.19 |
| 6,193,296 | B1 * | 2/2001 | Motozawa | B60N 2/286 296/68.1 |
| 6,224,131 | B1 * | 5/2001 | Shammout | B60N 2/4279 296/68.1 |
| 6,227,597 | B1 * | 5/2001 | Swann | B60N 2/4221 296/68.1 |
| 6,302,481 | B1 * | 10/2001 | Swann | B60N 2/067 297/216.19 |
| 6,398,285 | B2 * | 6/2002 | Motozawa | B62D 21/152 296/68.1 |
| 6,863,308 | B2 * | 3/2005 | Motozawa | B60R 22/1952 280/808 |
| 7,611,197 | B2 * | 11/2009 | Mattes | B60N 2/42736 297/216.16 |

FOREIGN PATENT DOCUMENTS

| | | |
|---|---|---|
| DE | 2 216 378 A1 | 10/1973 |
| DE | 195 37 225 A1 | 4/1997 |
| DE | 102 60 812 A1 | 7/2004 |
| DE | 10 2004 049 961 A1 | 4/2006 |
| DE | 10 2006 034 595 A1 | 1/2008 |
| GB | 2 369 772 A | 6/2002 |
| WO | WO 2006/068567 A1 | 6/2006 |
| WO | WO 2009/108140 A1 | 9/2009 |

OTHER PUBLICATIONS

German-language Written Opinion (PCT/ISA/237) issued in PCT Application No. PCT/EP2019/057260 dated Jul. 12, 2019 (six (6) pages).

German-language Search Report issued in German Application No. 10 2018 204 460.0 dated Mar. 19, 2019 with partial English translation (11 pages).

English translation of Chinese Office Action issued in Chinese Application No. 201980017502.6 dated Feb. 24, 2022 (nine (9) pages).

* cited by examiner

VEHICLE SEAT ARRANGEMENT

BACKGROUND AND SUMMARY OF THE INVENTION

The present invention relates to a vehicle seat arrangement. It further relates to a vehicle having such a vehicle seat arrangement.

With increasing automation of driving, new ergonomic seat positions in the vehicle are becoming increasingly important. One of these seat positions is a reclined position. In such reclined positions, the seatbelt does not extend substantially in front of the body but instead extends over the body of the person reclining on the seat. In order to be able to brake the body in the event of a collision, in this position the lower seat portion is generally directed obliquely upward with the front edge thereof and the vehicle seat can be moved in the event of a collision relative to the vehicle structure and fitted thereto by means of an energy absorption device. Depending on the intensity of the collision, in this instance, in spite of the presence of the energy absorption device, high acceleration peaks may occur.

DE 10 2004 049 961 A1 sets out and describes a vehicle seat which is connected to the body by means of front and rear deformation means which are vertically arranged in the z direction parallel with the vehicle vertical axis between the seat and the vehicle body. In the event of a front-end impact, the front deformation means are compressed in the z direction and the rear deformation means are extended in the z direction, whereby the seat carries out a rotation movement about a transverse axis during which the seat front edge moves downward. In the event of a rear-end impact, the rear deformation means are compressed in the z direction and the front deformation means are extended in the z direction, whereby the seat carries out an opposing rotation movement about a transverse axis during which the seat front edge moves upward. In addition, the vertically arranged deformation means may also be deformed laterally forward in order in the event of a collision to unload the structural elements of the seat.

In the Patent Application DE 10 2017 206 945 which has not been pre-published, a generic vehicle seat arrangement is described in which, in the event of a collision, the vehicle seat can be displaced relative to the vehicle structure in the seat longitudinal direction, wherein there is provided an energy absorption device which is effective between the seat portion and the vehicle structure in the seat longitudinal direction by braking the vehicle seat in the event of a collision. Preferably, the energy absorption device disclosed therein has at least one deformation element which converts the kinetic energy of the vehicle seat in the event of a collision into plastic deformation. In order to initiate this plastic deformation, a large initial force pulse is required and in turn means an initial impact loading for the body of the passenger reclining on the seat.

An object of the present invention is to construct a generic vehicle seat arrangement in such a manner that the impact loading for a person sitting or reclining on the seat is reduced.

This object is achieved with the features of the independent claims.

A vehicle seat arrangement having a vehicle seat for fitting to a vehicle structure of a vehicle, in particular a motor vehicle, having a lower seat portion and a seat backrest, wherein the lower seat portion is supported or can be supported so as to be able to be longitudinally displaced by means of a seat console on the vehicle structure, wherein at least the backrest can be adjusted from a seat position into a rest or reclining position and wherein between the lower seat portion and the vehicle structure there is provided an energy absorption device which, in the event of a collision of the vehicle with an obstacle when an acceleration acting on the vehicle seat is exceeded, permits a braked relative movement between the vehicle seat which continues to move forward as a result of inertia and the vehicle structure which is braked as a result of a collision along a braking path, wherein the vehicle seat in the normal state, that is to say, in the operating state of the vehicle, is locked relative to the vehicle structure by means of a locking device and, in the event of a collision, the locking is released and the longitudinal displaceability of the vehicle seat is released, is characterized in that the locking device is constructed in such a manner that the locking is released and the longitudinal displaceability of the vehicle seat is released before the mass-related inertia forces of the body of a person reclining on the vehicle seat are supported completely on the structure of the lower seat portion so that the body only comes into active force-transmitting contact with the seat structure when the vehicle seat is already moving forward relative to the vehicle structure.

The term "active force-transmitting contact" is not necessarily intended to be understood to be a direct physical contact, but instead an action in the sense of a support.

In the event of a collision, the vehicle structure is abruptly braked, wherein high acceleration peaks act on the vehicle. The body of a person (passenger) located on the vehicle seat in the rest or reclining position thereof is initially moved further counter to the collision direction, that is to say, in the movement direction of the vehicle (for example, in the travel direction), until after a resilient deformation of the soft seat cushion the passenger comes via his/her buttocks into active force-transmitting contact with the hard structure of the vehicle seat, for example, the seat shell or the seat base, and is supported thereon. Since the passenger lies or sits flat on the vehicle seat, the retention effect of a conventional seatbelt is only marginal.

In the case of a vehicle seat which is rigidly coupled to the vehicle structure, when the body of the passenger runs into the hard vehicle seat structure in this manner, the collision force which is directed counter to the movement direction of the body will act abruptly on the reclining body and in a direction substantially parallel or at a slight angle with respect to the spinal column.

Even when the vehicle seat with the passenger, for example, as a result of the pulse-related planned failure of a locking between the vehicle seat and the vehicle structure, for example, at a desired breaking location, moves forward in the direction toward an energy absorption device, for such a failure the dynamic action of the total mass of the vehicle seat and passenger is required, whereby the required pulse causes a force peak which acts on the body of the person. However, the objective must be to avoid such force peaks to the greatest possible extent or to at least reduce their effect on the human body. Precisely this is achieved by the invention.

As a result of the provision of the releasable locking of the locking device between the vehicle seat and the vehicle structure and the configuration of the locking device according to the invention, the longitudinal displaceability of the vehicle seat is already released at a time at which the body of the passenger is still in its inertia-related forward movement relative to the vehicle seat. This particular configuration of the locking device results in the body of the passenger only after the release of the locking device, that is to say, only being supported on the hard structure of the vehicle seat, when the vehicle seat—also as a result of inertia—is already moving forward relative to the vehicle structure, that is to say, in the travel direction, and the body consequently not yet being abruptly braked by the hard seat structure. The pulse acting on the body is thereby significantly smaller.

Preferably, the body of the passenger reclining on the seat is supported on the hard structure of the vehicle seat only whilst it runs into the braking action of the energy absorption device, that is to say, is already braked by the energy absorption device. At the time at which the body of the passenger comes into active force-transmitting contact with the structure of the lower seat portion of the vehicle seat, pulse-like acceleration (impact force) acting on the body of the passenger is thereby lower than with a seat which is still rigidly connected to the vehicle structure and consequently the loading for the body is smaller.

Therefore, the invention provides a vehicle seat arrangement which is constructed in such a manner that, in the case of a passenger reclining or sitting flat on the vehicle seat, in the event of a front-end collision, it follows a choreography, as a result of which collision-related force peaks acting on the body of the passenger are minimized or even prevented. According to this choreography, the locking between the vehicle seat and the vehicle structure is already released before the body is abruptly supported on the seat structure, that is to say, for example, whilst the body is still being braked by the seat cushion. Only when the vehicle seat moves forward as a result of inertia is the body supported on the seat structure and the unit comprising the vehicle seat and passenger is further braked by the energy absorption device. The inertia-related forward speed of the vehicle seat and passenger is thus reduced without relatively great force peaks so that any collision-related pulse which may then still occur is significantly smaller than with a conventionally constructed vehicle seat arrangement.

The time of release of the locking of the vehicle seat is in this instance preferably adapted to the release time of an airbag which is provided in front of the vehicle seat in such a manner that the body of the passenger which is moving counter to the collision force acting on the vehicle as a result of inertia but which is already braked by the energy absorption device comes into contact with the airbag at the time at which the inflated airbag has reached its maximum volume, or directly afterwards. As a result, a choreography is produced between the braking of the body of the passenger connected to the vehicle seat by the energy absorption device and the directly subsequently occurring braking of the body by the airbag which is very effective and which can keep the load peaks lower than in the prior art.

Other preferred and advantageous construction features of the vehicle seat arrangement according to the invention form the subject-matter of the dependent claims.

In a first preferred construction variant, the locking device has an unlocking mechanism having at least one actuator which, in the event of activation, brings about a release of the locking between the vehicle seat and the vehicle structure. With such an actuation device, the time of the separation of the locking can be controlled virtually freely.

In this instance, the actuator can preferably be controlled by means of an unlocking signal by a control device for the purposes of actuation and subsequently acts on an electrically, pneumatically, hydraulically or pyrotechnically actuatable separable connection element, wherein a collision signal, preferably from a collision sensor, is supplied to the control device, whereupon the control device transmits the unlocking signal on or after receiving the collision signal.

The controlled release of the rigid connection between the vehicle seat and the vehicle structure can thereby be incorporated in a particularly effective manner into the management of different retention systems. The initiation of the energy absorption device can be activated, for example, by a signal of a collision sensor which releases the longitudinal displaceability of the vehicle seat. The first energy absorption region can be activated in this instance by acting on the energy absorption device with an external signal, for example, an electrical signal which, for example, is provided by a collision sensor.

Alternatively, the locking device in the energy absorption device may be formed by at least one force limiter which, when a threshold value is exceeded, cancels the locking of the vehicle seat relative to the vehicle structure. The actuator is consequently in a purely mechanical and structural manner formed by the level of the response force of the force limiter (actuation force). In this construction variant, in which the actuation force is adapted, for example, to the mass of the empty vehicle seat (without any passenger), the energy absorption of the at least one force limiter already begins before the body of the passenger comes into contact with the vehicle seat structure. As a result, the vehicle seat is already in braked forward movement at the time of contact of the body with the seat structure and the body is braked in the first energy absorption region without the otherwise abrupt braking and without an exposed loading peak.

In another construction variant of this mechanical solution, the actuation force is adapted to a larger mass than that of the empty vehicle seat and the energy absorption of the at least one force limiter begins only when the body has already at least partially compressed the seat cushion and has already been slightly braked by it. In this instance, a portion of the mass of the body already acts together with the mass of the vehicle seat on the force limiter, whereupon it begins to brake the vehicle seat with the body in the first energy absorption region thereof. Also in this instance, the effect of the force limiter thus begins before the body strikes the hard, non-resiliently-deformable seat structure, that is to say, already before the body of the passenger comes into contact with the vehicle seat structure.

It is particularly advantageous for the energy absorption device to have a first energy absorption region having a lower actuation force and at least one other energy absorption region having a higher actuation force. The level of force of the energy absorption device acting on the body at the beginning of the braking of the body and vehicle seat is thereby initially lower in the first energy absorption region. Afterwards, at least one other energy absorption region with a higher actuation force is engaged and the unit comprising the body and vehicle seat is braked more powerfully. In this instance, the energy absorption device can preferably be controlled in an electrical manner and has electrically actuatable actuation devices for force limitation steps which are provided in the energy absorption device and which form the first and the at least one additional energy absorption region. The effect of increasing braking action may be further increased by the provision of more than one additional energy absorption region.

The pelvis and the spinal column of the passenger are braked more gently in the first energy absorption region and the initial loading peaks of the brake acceleration acting on the body and consequently the initial braking force are consequently lower than in the prior art. Only afterwards does the brake force increase after a first braking path distance has been travelled in the at least one additional energy absorption region without in this instance high loading peaks acting on the body.

Preferably, the energy absorption device is constructed in multiple steps and has a first force limitation step having the first energy absorption region and at least one additional force limitation step which has the at least one additional energy absorption region. In this instance, the increase of the actuation force from the first energy absorption region to the at least one additional energy absorption region is carried out in steps. This variant may be found to be structurally simpler than a non-stepped, continuous braking along the braking path.

The energy absorption device is preferably effective in a vertical seat longitudinal plane, preferably in the seat longitudinal direction or with a force component which acts primarily in the seat longitudinal direction. This embodiment is particularly effective in the event of front-end collisions.

It is also advantageous if the at least one additional energy absorption region of the energy absorption device can be activated by means of an associated braking signal with continued relative movement of the vehicle seat relative to the vehicle structure along the braking path. This braking signal may either be an electrical signal supplied externally to the force limiter or a deformation force threshold value of the additional energy absorption region being exceeded and can thus be carried out automatically in a purely mechanical, mass-controlled manner.

Preferably, the force limiter has at least one deformation element.

An embodiment of the invention is particularly advantageous which can be combined with other embodiments and in which the force limiter at least in order to form the first energy absorption region has a brake device which is preferably constructed as a friction brake.

An embodiment of the invention is further advantageous which can be combined with other embodiments and in which the at least one retention device for a person sitting on the vehicle seat, in particular a seatbelt arrangement, is fitted directly to the vehicle seat and/or to the vehicle seat console. The body of the passenger reclining on the vehicle seat, in addition to the support of the body on the seat base structure, is thereby connected to the greatest possible extent to the vehicle seat and can be braked together therewith in a controlled manner. Particularly in the event of choreographic interaction of the forward movement of the body braked by the energy absorption device with the braking action of the inflated airbag, the action of the retention device on the body of the passenger, particularly when the retention device has a belt tensioner which can be actuated by a signal, is preferably an additional component for actively braking the body under controlled force and acceleration actions on the body.

The invention is further directed toward a vehicle, in particular a motor vehicle, having at least one such vehicle structure.

Preferred embodiments of the invention with additional configuration details and additional advantages are described in greater detail and explained below with reference to the appended drawings.

DETAILED DESCRIPTION OF THE DRAWINGS

Figure 1:
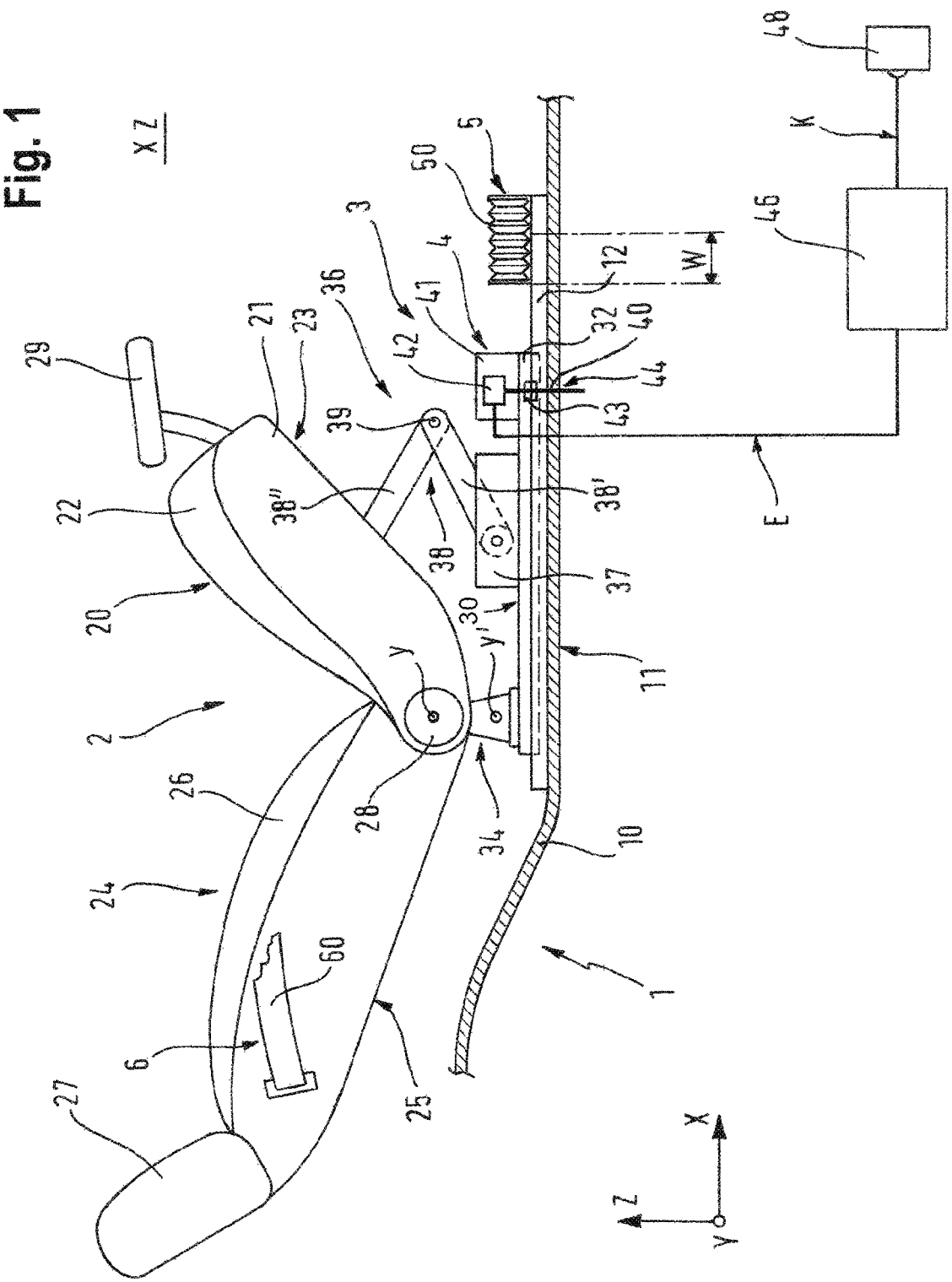
FIG. 1 is a schematic side view of a vehicle seat arrangement according to an embodiment of the invention in the rest or reclining position.

FIG. 1 is a schematic side view of the interior floor 10 of a vehicle 1 which is otherwise not illustrated in greater detail and which has a vehicle seat 2 of a vehicle seat arrangement, which seat 2 is fitted by means of a seat console 3 to the interior floor 10. The interior floor 10 is part of a vehicle structure 11 of the vehicle 1. For the purposes of longitudinal adjustment of the seat position, the vehicle seat 2 is supported so as to be able to be displaced relative to the vehicle structure 11 in the direction of the vehicle longitudinal axis X or parallel therewith. A locking device 4 which is illustrated only schematically in FIG. 1 fixes the vehicle seat 2 to the vehicle structure 11 during travel and when the vehicle seat 2 does not have to be adjusted relative to the vehicle structure 11 in the longitudinal direction. The vehicle seat arrangement comprises the vehicle seat 2, the seat console 3 and the locking device 4 which fixes the unit comprising the vehicle seat 2 and seat console 3 relative to the vehicle structure 11.

The vehicle seat 2 may be a front seat on the driver's or passenger's side, but it may also be provided in the rear of the vehicle at any side or may, in vehicles with a plurality of seat rows, also be provided in another seat row.

The vehicle seat 2 has a seat portion 20 with a seat base 21 of a seat structure 23 and a seat cushion 22 which is fitted to the seat base 21, and a backrest 24 with a backrest structure 25 and a backrest cushion 26 and a headrest 27. The backrest 24 is connected to the seat portion 20 by means of an articulation 28 which is constructed in conventional manner so as to be able to be inclined about a pivot axis y which is parallel with the vehicle transverse axis Y. In the region of the front end of the seat portion 20, the vehicle seat 2 is provided with a lower leg support 29 which can be deployed in the rest or reclining position shown.

The seat console 3 connects the seat structure 23, in particular the seat base 21 and consequently the entire vehicle seat, to the lower seat portion 20 and the backrest 24 which is pivotably fitted thereto, to the interior floor 10 of the vehicle 1 and consequently to the vehicle structure 11. Between the seat console 3 and the interior floor 10 of the vehicle 1, a longitudinal adjustment device 30 which is illustrated only schematically in the Figures is provided, wherein the seat console 3 is mounted on a longitudinally displaceable sliding member 32 of the longitudinal adjustment device 30. The sliding member 32 runs on a rail 12 which is connected to the vehicle structure 11. Although in FIG. 1 only one sliding member 32 and one rail 12 can be seen, it is self-evident to the person skilled in the art to provide a sliding member 32 and a rail 12 at each longitudinal side of the seat console 3, although a single central arrangement comprising a rail and sliding member is also conceivable.

Furthermore, the seat console 3 is provided with a tilting articulation 34 which is arranged in the rear region of the lower seat portion 20 and which has a tilting axis y' which extends parallel with the vehicle transverse axis Y about which the vehicle seat 2 can be pivoted from an upright seat position into the rest or reclining position shown. To this end, the seat console 3 is provided in the front region thereof with a tilting drive 36 which has a lever gear mechanism 38 which can be driven by a tilting drive device 37. A first lever 38' and a second lever 38" of the lever gear mechanism 38 are pivotably connected to each other at one of the ends thereof in each case in an articulation 39. The first lever 38' is securely connected with the other end thereof to the sliding member 32 and the second lever 38" is pivotably connected with the free end thereof to the seat structure 23 of the lower seat member 20.

A manually actuatable or, for example, electrically servo-controllable coupling device 40 of the locking device 4 fixes the sliding member 32 to the vehicle structure 11 when no longitudinal adjustment of the vehicle seat 2 is carried out. This fixing may, for example, be carried out by means of a self-locking gear mechanism of an electrical seat longitudinal adjustment device 41. The coupling device 40 is illustrated only schematically in FIG. 1 as a vertical line between the sliding member 32 and the rail 12, which illustrates the locking of the vehicle seat 2 relative to the vehicle structure 11.

The locking device 4 has an actuator 42 which is also illustrated only schematically and which actuates this locking in the event of a front-end collision in order to enable a free longitudinal displaceability of the vehicle seat 2 relative to the vehicle structure 11. This actuator 42 has, for example, a connection element 43 which is provided inside the coupling device 40 and which can be electrically, pneumatically, hydraulically or pyrotechnically separated. The connection element 43 after completed actuation interrupts the force path, which ensures the fixing of the vehicle seat 2 relative to the vehicle structure 11 in the vehicle longitudinal direction X, between the vehicle seat 2 and the vehicle structure 11.

In the event of a collision, a collision signal K is supplied to the control device 46 from a collision sensor 48. Subsequently, the control device 46 transmits, on receiving the collision signal K or with a time delay after receiving the collision signal, an unlocking signal E which is supplied to the actuator 42. The actuator 42 can thus be controlled by the control device 46 for the purposes of acting on the connection element 43 by means of an unlocking signal E, whereupon the connection element 43 is separated and the coupling device 40 separates between the vehicle seat 2 and the vehicle structure 11. In this manner, a rapidly acting, controllable unlocking mechanism 44 is formed for the vehicle seat 2.

Between the lower seat portion 20 and the vehicle structure 11 there is further provided an energy absorption device 5 which is also only illustrated schematically and which, in the event of a collision of the vehicle with an obstacle and the resulting actuation of the locking device 4, permits a braked relative movement between the vehicle seat 2 and the vehicle structure 11 along a braking path. The energy absorption device 5 has to this end, for example, at least one deformation element 50 which, on the one hand, is securely connected to the vehicle structure 11 and which, on the other hand, is supported on the vehicle seat 2.

After the coupling device 40 between the vehicle seat 2 and the vehicle structure 11 has been separated and the consequently uncoupled seat longitudinal adjustment device 41, the vehicle seat 2 with the sliding member 32 thereof can move forward on the rail 12 under the influence of the mass inertia thereof in a sliding manner in a substantially unimpeded manner until it strikes the energy absorption device 5 and is thereby braked with plastic deformation of the deformation element 50 along the braking path W.

The transmission of the unlocking signal E from the control device 46 to the actuator 42 is carried out at a time before the body of the passenger reclining on the vehicle seat 2 as a result of its own mass inertia strikes the seat structure 23 of the lower seat portion 20, for example, for 35 to 40 milliseconds, preferably 38 milliseconds, after the collision has been sensed. It is thereby possible for the body to strike the lower seat structure 23 of the vehicle seat 2 which is already moving forward relative to the vehicle structure 11, whereby the brake acceleration acting abruptly on the body upon impact is considerably reduced compared with the comparable situation with a vehicle seat 2 which is still connected to the vehicle structure 11.

In the example shown, the vehicle seat 2 is provided with an integrated retention device 6 for a person sitting or reclining on the vehicle seat 2 which in particular comprises a seatbelt arrangement 60, as generally known.

Figure 2:
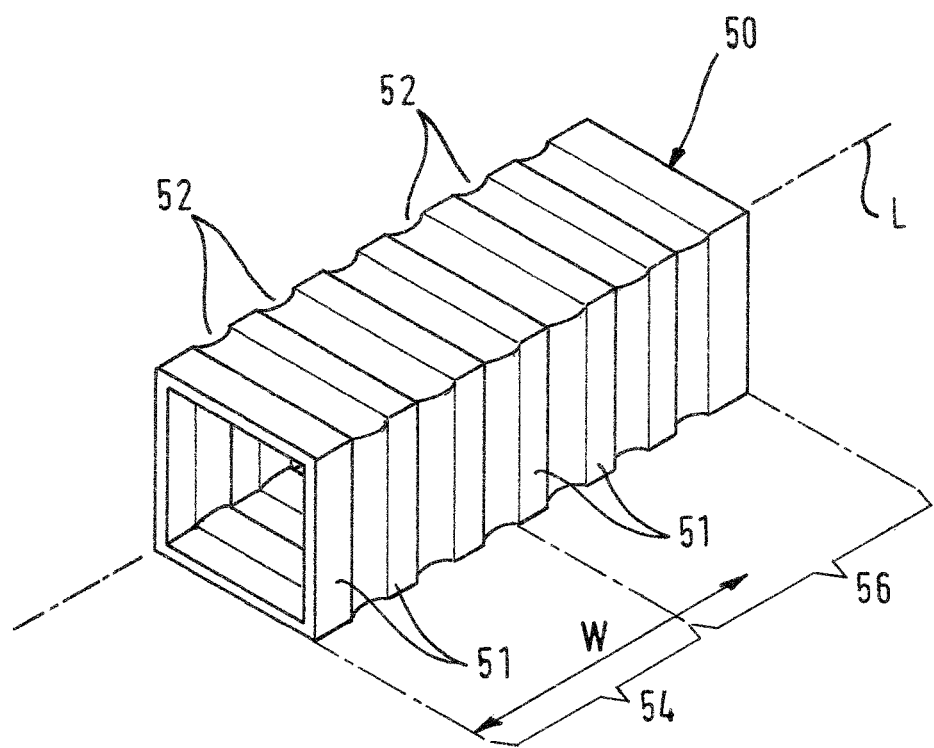
FIG. 2 shows an embodiment of a deformation element.

FIG. 2 shows an exemplary embodiment of a deformation element 50 of the energy absorption device 5. This deformation element 50 has a box-like hollow profile whose walls have in an alternating sequence portions 51 with a larger cross section and portions 52 with a smaller cross section which merge into each other.

This deformation element 50 is installed in such a manner between the vehicle structure 11 and the seat console 3 that the longitudinal axis L of the deformation element 50 in the installed state extends parallel with the vehicle longitudinal axis X. In the event of a front-end collision, during collision-related braking of the vehicle structure 11 the forward movement which is maintained as a result of the mass inertia of the vehicle seat 2 and the person sitting thereon, will thereby apply a force to the deformation element 50 which is directed substantially in the direction of the longitudinal axis L of the deformation element 50. The deformation element 50 folds up as a result of this action of force with plastic deformation in the manner of an accordion, wherein the length of the deformation element 50 is considerably reduced. In this instance, the kinetic energy of the vehicle seat 2 and the person seated thereon—or at least a considerable portion of this kinetic energy—is converted into deformation energy of the deformation element 50 and the inertia-related forward movement of the vehicle seat 2 is braked.

It is advantageous for the deformation element 50 to be constructed in such a manner that it has a first energy absorption region 54 with a lower actuation force for the plastic deformation and at least one additional energy absorption region 56 with a higher actuation force for the plastic deformation. In the event of a collision, the braking of the vehicle seat 2 can thereby be carried out initially in the first energy absorption region 54 with a lower force in an almost "gentle" manner and then, in a second energy absorption region 56 or even in other energy absorption regions, with a greater actuation force with increased dissipation of kinetic energy, wherein the vehicle seat 2 with the passenger reclining thereon is braked to an increasingly powerful extent before ultimately the collision force acts on the already substantially braked body of the passenger without further shock absorption. The lengths of the first energy absorption region 54 and the at least one additional energy absorption region 56 in the vehicle longitudinal direction together form the braking path W for the vehicle seat 2.

The invention is not limited to the above embodiment, which serves only to generally explain the core notion of the invention. In the context of the protective scope, the device according to the invention can instead also assume embodiments other than those described above. The device may in this instance have in particular features which constitute a combination of the respective individual features of the claims.

Reference numerals in the claims, the description and the drawings serve only for better understanding of the invention and are not intended to limit the protective scope.

LIST OF REFERENCE NUMERALS

1 Vehicle
2 Vehicle seat

3 Seat console
4 Locking device
5 Energy absorption device
6 Retention device
10 Interior floor
11 Vehicle structure
12 Rail
20 Seat portion
21 Seat base
22 Seat cushion
23 Seat structure
24 Backrest
25 Backrest structure
26 Backrest cushion
27 Headrest
28 Articulation
29 Lower leg support
30 Longitudinal adjustment device
32 Sliding member
34 Tilting articulation
36 Tilting drive
37 Tilting drive device
38 Lever gear mechanism
38' First lever
38" Second lever
39 Articulation
40 Coupling device
41 Seat longitudinal adjustment device
42 Actuator
43 Connection element
44 Unlocking mechanism
46 Control device
48 Collision sensor
50 Deformation element
51 Portion with larger cross section
52 Portion with smaller cross section
54 First energy absorption region
56 Second energy absorption region
60 Seatbelt arrangement
E Unlocking signal
K Collision signal
L Longitudinal axis of the deformation element
W Braking path
X Vehicle longitudinal axis
Y Vehicle transverse axis
Z Vehicle vertical axis
y Parallel pivot axis
y' Tilting axis

What is claimed is:

1. A vehicle seat arrangement, comprising:
a vehicle seat for fitting to a vehicle structure of a vehicle, the vehicle seat comprising:
  a lower seat portion which has a seat structure and a seat backrest, and
  a seat console, wherein the lower seat portion is supportable so as to be able to be longitudinally displaced by way of the seat console on the vehicle structure,
  and at least the backrest is adjustable from a seat position into a rest or reclining position;
an energy absorption device, between the lower seat portion and the vehicle structure which, in an event of a collision of the vehicle with an obstacle, permits a braked relative movement between the vehicle seat which continues to move forward as a result of inertia and the vehicle structure which is braked as a result of the collision along a braking path, and
a locking device, wherein
the vehicle seat in a normal state is locked relative to the vehicle structure by the locking device and, in the event of a collision, the locking is released, and
the locking device is constructed such that the locking is released and the longitudinal displaceability of the vehicle seat is released before mass-related inertia forces of a body of a person reclining on the vehicle seat are supported completely on the seat structure of the lower seat portion so that the body only comes into active force-transmitting contact with the seat structure when the vehicle seat is already moving forward relative to the vehicle structure.

2. The vehicle seat arrangement according to claim 1, wherein
the locking device has an unlocking mechanism with at least one actuator which, in the event of activation, brings about a release of the locking between the vehicle seat and the vehicle structure.

3. The vehicle seat arrangement according to claim 2, wherein
the actuator is controllable by way of an unlocking signal by a control device for purposes of actuation and acts on an electrically, pneumatically, hydraulically or pyrotechnically actuatable separable connection element, and
a collision signal from a collision sensor, is supplied to the control device, wherein
the control device transmits the unlocking signal on or after receiving the collision signal.

4. The vehicle seat arrangement according to claim 1, wherein
the locking device in the energy absorption device is formed by a force limiter which, when a threshold value is exceeded, cancels the locking of the vehicle seat relative to the vehicle structure.

5. The vehicle seat arrangement according to claim 1, wherein
the energy absorption device has a first energy absorption region having a lower actuation force and at least one additional energy absorption region having a higher actuation force.

6. The vehicle seat arrangement according to claim 5, wherein
the increase of the actuation force from the first energy absorption region to the at least one additional energy absorption region is carried out in steps so that the energy absorption device is constructed with multiple steps and has a first force limitation step and at least one additional force limitation step.

7. The vehicle seat arrangement according to claim 1, wherein
the energy absorption device is effective in a vertical seat longitudinal plane.

8. The vehicle seat arrangement according to claim 7, wherein
the energy absorption device is effective in the seat longitudinal direction or with a force component which acts primarily in the seat longitudinal direction.

9. The vehicle seat arrangement according to claim 5, wherein
the at least one additional energy absorption region of the energy absorption device is activatable by an associated braking signal with continued relative movement of the vehicle seat relative to the vehicle structure along the braking path.

10. The vehicle seat arrangement according to claim 1, wherein
the energy absorption device has at least one deformation element.

11. The vehicle seat arrangement according to claim 5, wherein
the energy absorption device, at least in order to form the first energy absorption region, has a brake device which is preferably constructed as a friction brake.

12. The vehicle seat arrangement according to claim 1, further comprising:
at least one retention device for a person sitting on the vehicle seat, fitted directly to the vehicle seat and/or to the vehicle seat console.

13. The vehicle seat arrangement according to claim 12, wherein
the retention device is a seatbelt arrangement.

14. A vehicle comprising at least one vehicle seat arrangement as claimed in claim 1.

15. The vehicle according to claim 14, wherein the vehicle is a motor vehicle.

* * * * *